US011075386B2

(12) United States Patent
Torita et al.

(10) Patent No.: US 11,075,386 B2
(45) Date of Patent: Jul. 27, 2021

(54) NON-AQUEOUS ELECTROLYTE SECONDARY BATTERY HAVING POSITIVE ELECTRODE INCLUDING CARBOXYMETHYLCELLULOSE, POLYMER BINDER, CONDUCTIVE MATERIAL, AND INORGANIC FILLER (71) Applicant: TOYOTA JIDOSHA KABUSHIKI KAISHA, Toyota (JP)

(72) Inventors: Koji Torita, Nagoya (JP); Harunari Shimamura, Toyonaka (JP); Yusuke Fukumoto, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 16/562,892

(22) Filed: Sep. 6, 2019

(65) Prior Publication Data

US 2020/0083538 A1 Mar. 12, 2020

(30) Foreign Application Priority Data

Sep. 10, 2018 (JP) .............................. JP2018-168489

(51) Int. Cl.
*H01M 4/62* (2006.01)
*H01M 4/66* (2006.01)
*H01M 4/13* (2010.01)
*H01M 10/052* (2010.01)
*H01M 4/02* (2006.01)
*H01M 4/131* (2010.01)

(52) U.S. Cl.
CPC .............. *H01M 4/628* (2013.01); *H01M 4/13* (2013.01); *H01M 4/62* (2013.01); *H01M 4/667* (2013.01); *H01M 4/131* (2013.01); *H01M 4/622* (2013.01); *H01M 10/052* (2013.01); *H01M 2004/028* (2013.01); *Y02E 60/10* (2013.01)

(58) Field of Classification Search
CPC .......... H01M 4/13; H01M 4/131; H01M 4/62; H01M 4/622; H01M 4/628; H01M 4/667; H01M 10/052; H01M 2004/028
See application file for complete search history.

(56) References Cited

U.S. PATENT DOCUMENTS

| | | | |
|---|---|---|---|
| 2013/0224587 A1 | 8/2013 | Uemura | |
| 2014/0072877 A1 | 3/2014 | Araki et al. | |
| 2015/0340697 A1* | 11/2015 | Jang | H01M 10/052 429/341 |
| 2020/0006778 A1* | 1/2020 | Endo | H01M 4/622 |

FOREIGN PATENT DOCUMENTS

| | | |
|---|---|---|
| JP | 2014-75335 A | 4/2014 |
| WO | 2012057031 A1 | 5/2012 |
| WO | 2018168271 A1 | 9/2018 |

* cited by examiner

Primary Examiner — Ula C Ruddock
Assistant Examiner — Mary Grace Byram
(74) Attorney, Agent, or Firm — Sughrue Mion, PLLC (57) ABSTRACT A non-aqueous electrolyte secondary battery includes at least a positive electrode, a negative electrode, and an electrolyte. The positive electrode includes a positive electrode current collector, an intermediate layer, and a positive electrode active material layer. The intermediate layer is interposed between the positive electrode current collector and the positive electrode active material layer. The intermediate layer contains at least carboxymethylcellulose, a conductive material, and an inorganic filler.

4 Claims, 4 Drawing Sheets

NON-AQUEOUS ELECTROLYTE SECONDARY BATTERY HAVING POSITIVE ELECTRODE INCLUDING CARBOXYMETHYLCELLULOSE, POLYMER BINDER, CONDUCTIVE MATERIAL, AND INORGANIC FILLER

This nonprovisional application claims priority to Japanese Patent Application No. 2018-168489 filed on Sep. 10, 2018, with the Japan Patent Office, the entire contents of which are hereby incorporated by reference.

BACKGROUND

Field

The present disclosure relates to a non-aqueous electrolyte secondary battery.

Description of the Background Art

Japanese Patent Laying-Open No. 2014-075335 discloses interposing an undercoat layer between a positive electrode current collector and a positive electrode active material layer. According to the document, the electrical resistance of the undercoat layer is higher than the electrical resistance of the positive electrode current collector.

SUMMARY

Abnormal conditions of a non-aqueous electrolyte secondary battery (which may be simply called "battery" hereinafter) include a short circuit caused by an external input. This phenomenon may occur in the following way: a sharp, conductive object passes through a casing (namely, the housing of the battery) and enters inside the battery and then the sharp object, which has thus entered inside the battery, causes a short circuit between the positive electrode and the negative electrode. This type of short circuit caused by an external input is simulated by a nail penetration test, for example.

Typically, a positive electrode includes a positive electrode current collector and a positive electrode active material layer. The positive electrode active material layer covers a surface of the positive electrode current collector. The positive electrode active material layer, however, may come off upon impact exerted by an external input, exposing the positive electrode current collector. If the exposed part of the positive electrode current collector comes into contact with the negative electrode, a large short-circuit current may flow. This phenomenon is considered attributed to a low electrical resistance of the positive electrode current collector. The large short-circuit current may cause an increase in heat generation within the battery.

To mitigate a positive electrode current collector from being exposed, disposing an intermediate layer is considered. More specifically, interposing an intermediate layer between a positive electrode current collector and a positive electrode active material layer is considered. This intermediate layer may mitigate the positive electrode current collector from coming into contact with the negative electrode in case the positive electrode active material layer comes off.

The electrical resistance of the intermediate layer needs to be higher than the electrical resistance of the positive electrode current collector. However, an excessively high electrical resistance of the intermediate layer may interfere with the current flow between the positive electrode current collector and the positive electrode active material layer during normal operation; in other words, it may degrade battery performance.

The electrical resistance of the intermediate layer may be adjusted by changing the composition of the intermediate layer. For instance, the intermediate layer contains an inorganic filler, a conductive material, and a binder. The inorganic filler is an electrically insulating component, and, therefore, the content of the inorganic filler may be increased to increase the electrical resistance of the intermediate layer. The conductive material is an electrically conductive component, and, therefore, the content of the conductive material may be increased to decrease the electrical resistance of the intermediate layer.

The binder is an adhesive, polymer compound. The binder is used for binding the ingredients of the intermediate layer. The binder may be polyvinylidene difluoride (PVdF), for example. Generally, it is considered that a binder also belongs to electrically insulating components.

According to a novel finding of the present disclosure, the binder may become carbonized by heat that is generated upon an external input. The binder thus carbonized may be conductive. This means that the carbonization of the binder may cause formation of a new conduction path. This, in turn, means that, upon an external input, the electrical resistance of the intermediate layer may decrease and consequently the short-circuit current may increase. In other words, carbonization of the binder may enhance heat generation occurring upon an external input.

An object of the present disclosure is to mitigate heat generation occurring upon an external input.

In the following, the technical structure and the effects according to the present disclosure are described. It should be noted that the action mechanism according to the present disclosure includes presumption. Therefore, the scope of claims should not be limited by whether or not the action mechanism is correct.

[1] A non-aqueous electrolyte secondary battery includes at least a positive electrode, a negative electrode, and an electrolyte. The positive electrode includes a positive electrode current collector, an intermediate layer, and a positive electrode active material layer. The intermediate layer is interposed between the positive electrode current collector and the positive electrode active material layer. The intermediate layer contains at least carboxymethylcellulose, a conductive material, and an inorganic filler.

The inorganic filler is an electrically insulating component. The conductive material is an electrically conductive component. The inorganic filler and the conductive material are used for adjusting the electrical resistance of the intermediate layer to a predetermined amount.

Carboxymethylcellulose (CMC) may function as a binder. When heated alone, CMC becomes carbonized in the same manner as PVdF and/or the like does. Carbonized CMC may form a conduction path.

According to a novel finding of the present disclosure, heating a mixture of CMC and an inorganic filler may cause the CMC to burn away instead of becoming carbonized, and heating a mixture of PVdF and/or the like and an inorganic filler may cause the PVdF and/or the like to become carbonized. The phenomenon of CMC burning away, which may be called a CMC-burn-away phenomenon, is considered unique to a mixture of CMC and an inorganic filler.

The intermediate layer according to the present disclosure contains a mixture of CMC and an inorganic filler. In the intermediate layer according to the present disclosure, CMC may burn away upon an external input and, therefore, conduction path formation due to carbonized CMC practically may not occur. In addition, the CMC-burn-away phenomenon may increase the inorganic filler ratio within the intermediate layer. This may increase the electrical resistance of the intermediate layer and may mitigate a short-circuit current.

By the way, it is considered that CMC burns away as it reacts with oxygen.

This means that the CMC-burn-away phenomenon may consume oxygen. It is considered that an external input is accompanied by release of oxygen from the positive electrode. It is also considered that oxygen contributes to combustion reaction of an electrolyte and the like. Therefore, oxygen consumption associated with the CMC-burn-away phenomenon may mitigate combustion reaction of an electrolyte and the like. When the combustion reaction is thus mitigated, heat generation occurring upon an external input may decrease.

A series of actions described above may synergistically mitigate heat generation occurring upon an external input in the battery according to the present disclosure.

[2] The carboxymethylcellulose may be contained in the intermediate layer in an amount not lower than 0.5 mass % and not higher than 40 mass %.

An increase in the CMC content may lead to an increase in oxygen consumption occurring in association with the CMC-burn-away phenomenon. When the CMC content of the intermediate layer is not lower than 0.5 mass %, heat generation occurring upon an external input may decrease.

CMC may inhibit ionic conduction within the intermediate layer. Therefore, the lower the CMC content is, the more actively the ionic conduction may proceed within the intermediate layer. When the CMC content of the intermediate layer is not higher than 40 mass %, the ionic conduction may proceed actively and, as a result, the rate of rise in resistance during normal operation may decrease.

[3] The carboxymethylcellulose may have a weight average molecular weight not lower than 250,000 and not higher than 500,000.

When the weight average molecular weight (Mw) of CMC is not lower than 250,000, heat generation occurring upon an external input may decrease. It may be because, as the Mw of CMC increases, oxygen consumption associated with the CMC-burn-away phenomenon increases. When the Mw of CMC is not higher than 500,000, the rate of rise in resistance during normal operation may decrease. It may be because, as the Mw of CMC decreases, CMC becomes less likely to interfere with ionic movement.

[4] The intermediate layer may contain essentially no polymer compound other than the carboxymethylcellulose.

In the configuration according to [1] above, the intermediate layer may further contain a polymer compound (such as a binder) other than CMC. It is because, as long as at least part of the polymer compound is CMC, conduction path formation caused by carbonized matter upon an external input may be reduced.

When the intermediate layer contains essentially no polymer compound other than CMC, conduction path formation caused by carbonized matter upon an external input may be further reduced. As a result, heat generation occurring upon an external input may decrease.

The expression "contains essentially (no polymer compound other than CMC)" means that the amount of this polymer compound other than CMC is so low that only a negligible influence, if any, would be exerted upon carbonization of this polymer compound. For example, the content of the polymer compound other than CMC may be not lower than 0 mass % and not higher than 0.1 mass %.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. However, the description below does not limit the scope of claims.

<Non-Aqueous Electrolyte Secondary Battery>

Figure 1:
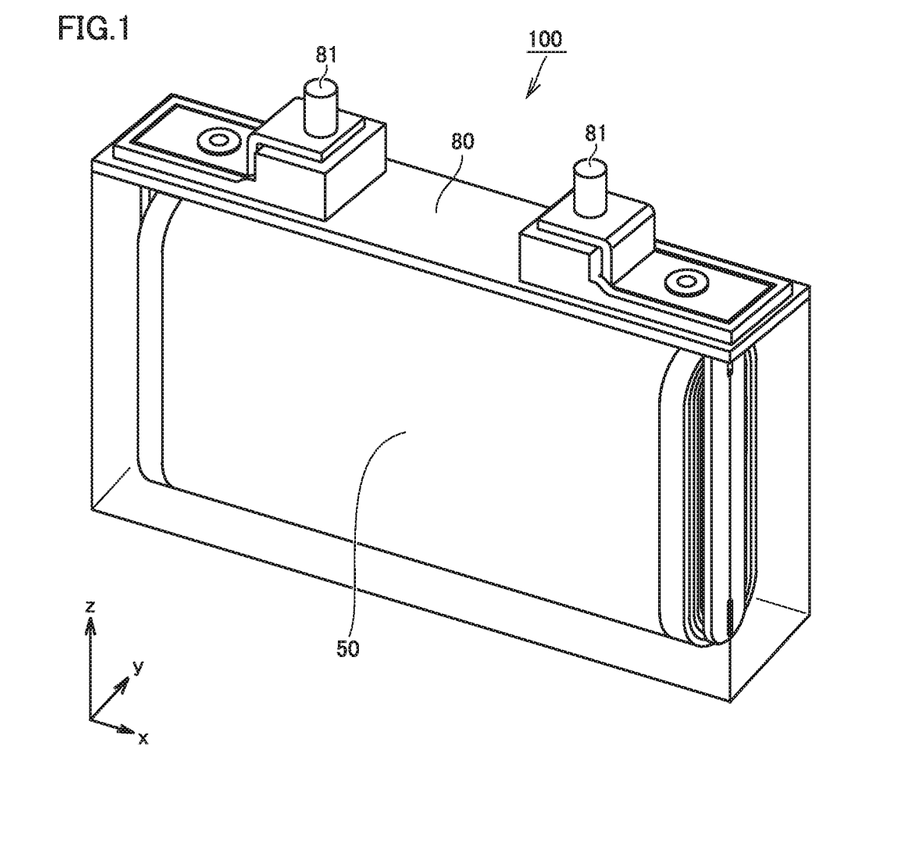
FIG. 1 is a schematic view illustrating the structure of a non-aqueous electrolyte secondary battery according to the present embodiment.

FIG. 1 is a schematic view illustrating the structure of a non-aqueous electrolyte secondary battery according to the present embodiment.

A battery 100 is a non-aqueous electrolyte secondary battery. Battery 100 includes a casing 80. Casing 80 may be made of aluminum (Al) alloy, for example. Casing 80 is a container of a prismatic shape (a flat, rectangular parallelepiped). However the shape of casing 80 is not particularly limited. For example, casing 80 may be a cylindrical container. For example, casing 80 may be a pouch made of Al-laminated film.

Casing 80 is equipped with a terminal 81. Casing 80 may further be equipped with a current interrupt device (CID), a gas-discharge valve, and a liquid inlet, for example. Casing 80 accommodates an electrode array 50 and an electrolyte (not shown). Electrode array 50 is electrically connected to terminal 81.

Figure 2:
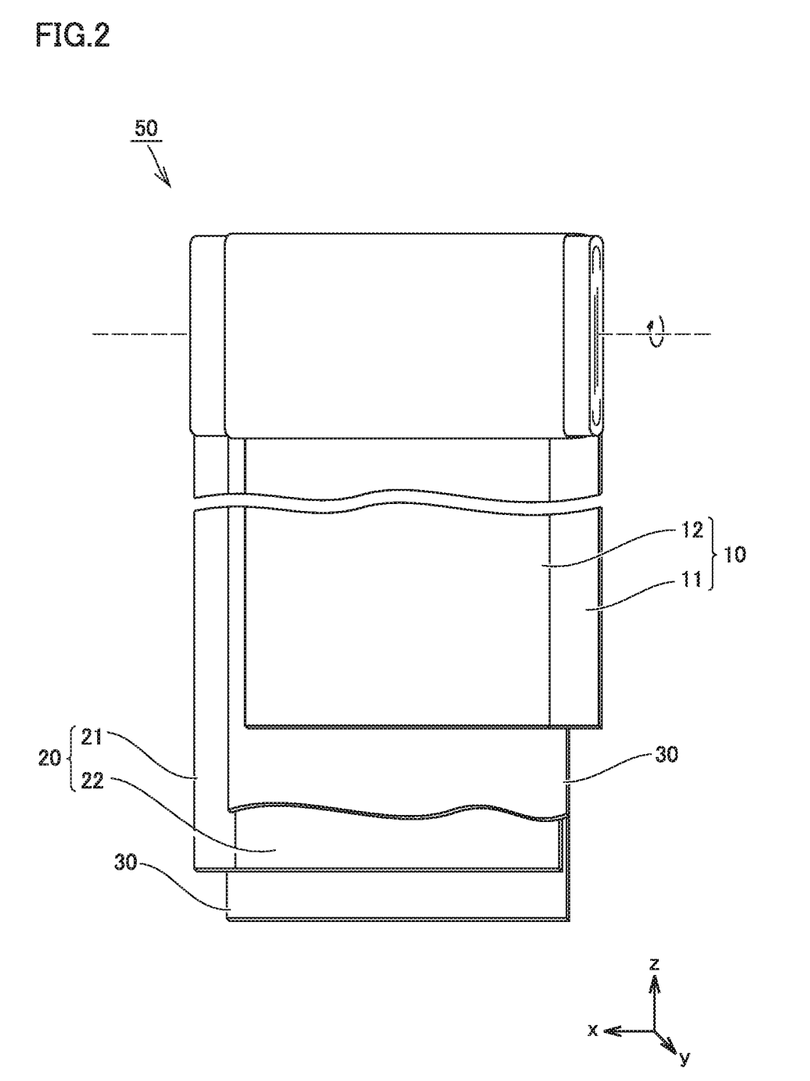
FIG. 2 is a schematic view illustrating the structure of an electrode array according to the present embodiment.

FIG. 2 is a schematic view illustrating the structure of the electrode array according to the present embodiment.

Electrode array 50 is a wound-type one. Electrode array 50 is formed by stacking a positive electrode 10, a separator 30, a negative electrode 20, and separator 30 in this order and then winding them in a spiral fashion. In other words, battery 100 includes at least positive electrode 10, negative electrode 20, and an electrolyte (not shown). Electrode array 50 may be formed flat.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

Battery 100 may include no separator 30. In the configuration in which battery 100 is an all-solid-state battery, for example, battery 100 may include no separator 30.

<Positive Electrode>

Figure 3:
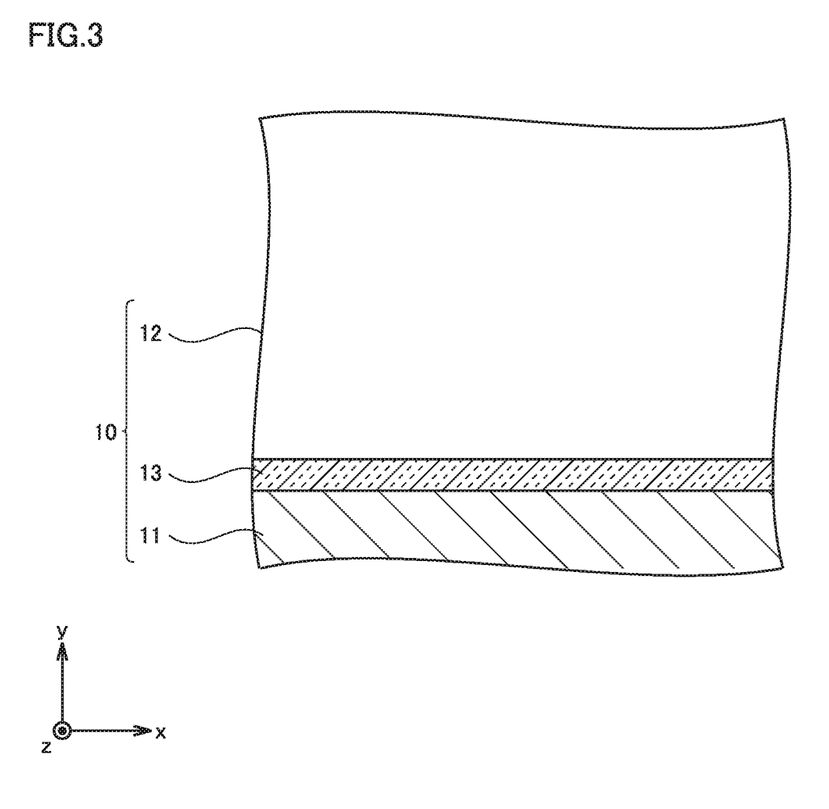
FIG. 3 is a schematic sectional view illustrating the structure of a positive electrode according to the present embodiment.

FIG. 3 is a schematic sectional view illustrating the structure of the positive electrode according to the present embodiment.

Positive electrode 10 is in sheet form. Positive electrode 10 includes a positive electrode current collector 11, an intermediate layer 13, and a positive electrode active material layer 12. Intermediate layer 13 is interposed between positive electrode current collector 11 and positive electrode active material layer 12. Intermediate layer 13 and positive electrode active material layer 12 may be disposed on only one side of positive electrode current collector 11. Intermediate layer 13 and positive electrode active material layer 12 may be disposed on both sides of positive electrode current collector 11.

<<Positive Electrode Current Collector>>

Positive electrode current collector 11 is a conductive sheet. The thickness of positive electrode current collector 11 may be not smaller than 1 μm and not greater than 17 μm, for example. Positive electrode current collector 11 may be an Al foil, for example. The thickness of the Al foil may be not smaller than 5 μm and not greater than 17 μm, for example. Positive electrode current collector 11 may be a titanium (Ti) foil, for example. The thickness of the Ti foil may be not smaller than 1 μm and not greater than 15 μm, for example.

In the present embodiment, the thickness of each component may be measured with a micrometer, for example. The thickness of each component may be measured in a cross-sectional micrograph (such as a scanning electron micrograph), for example. The thickness is measured at at least three positions. The arithmetic mean of these at least three measurements is used.

<<Intermediate Layer>>

Intermediate layer 13 is interposed between positive electrode current collector 11 and positive electrode active material layer 12. The thickness of intermediate layer 13 may be not smaller than 0.5 μm and not greater than 10 μm, for example. The thickness of intermediate layer 13 may be not smaller than 0.5 μm and not greater than 5 μm, for example. Intermediate layer 13 contains at least CMC, a conductive material, and an inorganic filler.

(CMC)

CMC functions as a binder. Although the detailed mechanism is unclear, CMC in the presence of the inorganic filler may burn away when heated. In the configuration in which CMC thus burns away instead of becoming carbonized, heat generation occurring upon an external input may decrease.

CMC may be an acid-form CMC (CMC-H), for example. CMC may be a sodium salt (CMC-Na), a lithium salt (CMC-Li), and/or an ammonium salt (CMC-NH$_4$), for example. The degree of etherification of CMC is not particularly limited. The degree of etherification may be not lower than 0.5 and not higher than 1, for example.

(CMC Content)

The CMC content of intermediate layer 13 may be not lower than 0.2 mass % and not higher than 45 mass %, for example. The CMC content of intermediate layer 13 may be not lower than 0.5 mass % and not higher than 40 mass %, for example. A CMC content of intermediate layer 13 not lower than 0.5 mass % may result in a decrease in heat generation occurring upon an external input. A CMC content not higher than 40 mass % may result in a decrease in the rate of rise in resistance during normal operation.

The CMC content of intermediate layer 13 may be not lower than 2 mass %, for example. The CMC content of intermediate layer 13 may be not lower than 10 mass %, for example. The CMC content of intermediate layer 13 may be not higher than 30 mass %, for example. The CMC content of intermediate layer 13 may be not higher than 20 mass %, for example.

(Weight Average Molecular Weight of CMC)

The weight average molecular weight (Mw) of CMC may be not lower than 200,000 and not higher than 520,000, for example. The Mw of CMC may be not lower than 250,000 and not higher than 500,000, for example. An Mw of CMC not lower than 250,000 may result in a decrease in heat generation occurring upon an external input. An Mw of CMC not higher than 500,000 may result in a decrease in the rate of rise in resistance during normal operation. The Mw of CMC may be not lower than 330,000, for example. The Mw of CMC may be not higher than 400,000.

The Mw of CMC is measured by gel permeation chromatography (GPC).

A calibration curve prepared for a reference material is used with the CMC elution time to determine the Mw of CMC. The reference material is pullulan. The Mw measurement is carried out at least three times. The arithmetic mean of these at least three measurements is used.

(Conductive Material)

The conductive material is an electrically conductive component. Typically, the conductive material is in the form of particles. The content of the conductive material in intermediate layer 13 may be not lower than 0.5 mass % and not higher than 5 mass %, for example. The conductive material is not particularly limited. The conductive material may be a carbon material, for example. The conductive material may be at least one selected from the group consisting of carbon black, graphite, vapor grown carbon fiber (VGCF), carbon nanotube (CNT), and graphene, for example. The carbon black may be at least one selected from the group consisting of acetylene black (AB), Ketjenblack (registered trademark, KB), furnace black (FB), channel black (CB), and thermal black (TB), for example.

(Inorganic Filler)

The inorganic filler is an electrically insulating component. The inorganic filler may make up the rest of intermediate layer 13 after CMC and the conductive material are hypothetically subtracted. The content of the inorganic filler in intermediate layer 13 may be not lower than 45 mass % and not higher than 99.3 mass %, for example. The content of the inorganic filler in intermediate layer 13 may be not lower than 52 mass % and not higher than 96.8 mass %, for example. The content of the inorganic filler in intermediate layer 13 may be not lower than 57 mass % and not higher than 96.5 mass %, for example.

The inorganic filler is in the form of particles. The D50 of the inorganic filler may be not lower than 0.1 μm and not higher than 3 μm, for example. The "D50" refers to a particle size in volume-based particle size distribution obtained by laser diffraction at which the cumulative particle volume (accumulated from the side of small sizes) reaches 50% of the total particle volume. The shape of the particles of the inorganic filler is not particularly limited. The particles of the inorganic filler may be spherical, in lumps, needle-like, or in flakes, for example.

The inorganic filler consists of an electrically insulating, inorganic compound. The inorganic filler is not particularly limited. Desirably, the inorganic filler is heat resistant. The inorganic filler may be at least one selected from the group consisting of boehmite, α-alumina, titania, magnesia, aluminum hydroxide, magnesium hydroxide, and zinc hydroxide, for example. The titania may be rutile titania. The titania may be anatase titania. It is considered that these inorganic compounds have suitable levels of heat resistance.

The inorganic filler may be at least one selected from the group consisting of rutile titania, anatase titania, alumina, boehmite, and magnesium hydroxide, for example.

(Additional Component)

As long as containing CMC, the conductive material, and the inorganic filler, intermediate layer 13 may further contain an additional component. The content of the additional component may be not lower than 0.1 mass % and not higher than 10 mass %, for example. The additional component may be a solid electrolyte, for example.

As the additional component, a polymer compound other than CMC is also considered, for example. The polymer compound other than CMC may be an organic filler, for example. The polymer compound other than CMC may be a binder, for example. The binder may be at least one selected from the group consisting of acrylic resin and PVdF, for example. The acrylic resin refers to a polymer compound formed by polymerization of at least one monomer selected from the group consisting of acrylic acid esters, methacrylic acid esters, and acrylonitrile.

It should be noted that the polymer compound other than CMC can become carbonized upon an external input. When intermediate layer 13 contains essentially no polymer compound other than CMC, heat generation occurring upon an external input may decrease. Intermediate layer 13 may consist essentially of CMC, the conductive material, and the inorganic filler.

<<Positive Electrode Active Material Layer>>

Positive electrode active material layer 12 is formed on a surface of intermediate layer 13. The thickness of positive electrode active material layer 12 may be not smaller than 50 μm and not greater than 100 μm. Positive electrode active material layer 12 contains at least a positive electrode active material. For instance, positive electrode active material layer 12 may contain a conductive material in an amount not lower than 0.1 mass % and not higher than 10 mass % and a binder in an amount not lower than 0.1 mass % and not higher than 10 mass % with the remainder being made up of the positive electrode active material.

Typically, the positive electrode active material is in the form of particles. The D50 of the positive electrode active material may be not lower than 1 μm and not higher than 30 μm, for example. The positive electrode active material is not particularly limited. The positive electrode active material may be at least one selected from the group consisting of lithium cobalt oxide, lithium nickel oxide, lithium manganese oxide, lithium nickel cobalt aluminate, lithium nickel cobalt manganese oxide, and lithium iron phosphate, for example.

The lithium nickel cobalt aluminate refers to, for example, a compound represented by the following formula (1):

$$LiNi_{x1}Co_{y1}Al_{z1}O_2 \qquad (1)$$

(where x1, y1, and z1 satisfy $0.82 \leq x1 \leq 0.95$, $0.01 \leq y1 \leq 0.15$, $0.01 \leq z1 \leq 0.15$, and $x1+y1+z1=1$). For example, x1 may be 0.88.

The lithium nickel cobalt manganese oxide refers to, for example, a compound represented by the following formula (2):

$$LiNi_{x2}Co_{y2}Mn_{z2}O_2 \qquad (2)$$

(where x2, y2, and z2 satisfy $0.35 \leq x2 \leq 0.95$, $0.01 \leq y2 \leq 0.60$, $0.01 \leq z2 \leq 0.60$, and $x2+y2+z2=1$).

The positive electrode active material may include an additive material. For example, the additive material may be an alkaline-earth metal, a transition metal, a base metal, and/or a semimetal. The additive material may be a compound (such as a metal oxide). For instance, the additive material may partially replace the base element (such as Co in $LiCoO_2$). The additive material may be adhered to surfaces of the particles of the base element. The positive electrode active material may include only one type of the additive material. The positive electrode active material may include two or more types of the additive material. The total content of the additive material may be not higher than 5 mol %, for example.

The conductive material contained in positive electrode active material layer 12 is not particularly limited. The conductive material may be at least one selected from the group consisting of carbon black, graphite, soft carbon, hard carbon, VGCF, CNT, and graphene, for example.

The binder contained in positive electrode active material layer 12 is not particularly limited. The binder may be at least one selected from the group consisting of PVdF, vinylidene difluoride-hexafluoropropylene copolymer (PVdF-HFP), acrylic resin, and polytetrafluoroethylene (PTFE), for example.

<<Method of Producing Positive Electrode>>

Figure 4:
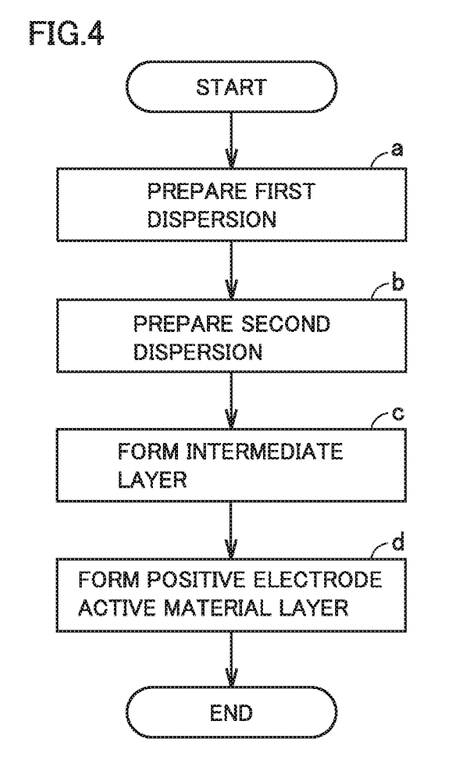
FIG. 4 is a flowchart schematically illustrating a method of producing a positive electrode according to the present embodiment.

FIG. 4 is a flowchart schematically illustrating a method of producing a positive electrode according to the present embodiment.

The present embodiment also provides a method of producing a positive electrode for a non-aqueous electrolyte secondary battery. The method of producing a positive electrode according to the present embodiment includes at least "a. preparing a first dispersion", "b. preparing a second dispersion", "c. forming an intermediate layer", and "d. forming a positive electrode active material layer".

(a. Preparing First Dispersion)

The method of producing a positive electrode according to the present embodiment includes preparing a first dispersion by mixing at least CMC, an inorganic filler, and water.

CMC and the inorganic filler are described above in detail. The mixing may be carried out with a typical mixer. For example, a homogenizing disperser and/or a planetary mixer may be used. The solid matter ratio during mixing may be not lower than 30 mass % and not higher than 60 mass %, for example. The "solid matter ratio" refers to the ratio of all the components except the solvent (water).

CMC and water may be firstly mixed to prepare an aqueous CMC solution, and subsequently, the resulting aqueous CMC solution may be mixed with the inorganic filler.

After CMC and the inorganic filler are thoroughly mixed, water is added to the first dispersion. After the addition of water, the first dispersion is stirred. The final solid matter ratio of the first dispersion may be not lower than 25 mass % and not higher than 45 mass %, for example.

(b. Preparing Second Dispersion)

The method of producing a positive electrode according to the present embodiment includes preparing a second dispersion by mixing at least the first dispersion and a conductive material.

The conductive material is described above in detail. The mixing may be carried out with a typical mixer. The final solid matter ratio of the second dispersion may be not lower than 30 mass % and not higher than 45 mass %, for example. To adjust the solid matter ratio, water may be further added as appropriate.

The conductive material, a dispersant, and water may be firstly mixed to prepare a conductive material dispersion (conductive paste). The solid matter ratio of the resulting conductive material dispersion may be not lower than 30 mass % and not higher than 45 mass %, for example. The conductive material dispersion may be mixed with the first dispersion to prepare a second dispersion.

(c. Forming Intermediate Layer)

The method of producing a positive electrode according to the present embodiment includes forming intermediate layer 13 by applying the second dispersion to a surface of positive electrode current collector 11 and drying.

The positive electrode current collector is described above in detail. The applying may be carried out with a typical applicator. A gravure coater, a knife coater, a multi coater, a die coater, a doctor blade, and/or an ink-jet coater may be used, for example. The drying may be carried out with a typical dryer. A hot-air drying furnace may be used, for example. The drying temperature may be not lower than 60° C. and not higher than 110° C., for example. The drying duration may be adjusted in accordance with the drying temperature, for example. When the drying temperature is about 100° C., for example, the drying duration may be about 10 minutes.

(d. Forming Positive Electrode Active Material Layer)

The method of producing a positive electrode according to the present embodiment includes forming positive electrode active material layer 12 on a surface of intermediate layer 13 to produce positive electrode 10.

For instance, a positive electrode active material, a conductive material, a binder, and a solvent are mixed to prepare an active material paste. The positive electrode active material, the conductive material, and the binder are described above in detail. The solvent is selected in accordance with the type of the binder. The solvent may be N-methyl-2-pyrrolidone (NMP), for example.

By applying the active material paste to a surface of intermediate layer 13 and drying, positive electrode active material layer 12 may be formed. The applying may be carried out with a typical applicator. After positive electrode active material layer 12 is dried, positive electrode active material layer 12 may be compressed. Positive electrode active material layer 12 is thus formed, and in this way, positive electrode 10 is produced. Positive electrode 10 may be cut into a predetermined shape in accordance with the specifications of battery 100.

In this way, positive electrode 10 is produced.

As described above, the method of producing a positive electrode according to the present embodiment includes at least (a) to (d) below:

(a) preparing a first dispersion by mixing at least CMC, an inorganic filler, and water;

(b) preparing a second dispersion by mixing at least the first dispersion and a conductive material;

(c) forming intermediate layer 13 by applying the second dispersion to a surface of positive electrode current collector 11 and drying; and (d) forming positive electrode active material layer 12 on a surface of intermediate layer 13 to produce positive electrode 10.

By employing the method of producing a positive electrode according to the present embodiment, CMC and the inorganic filler may readily come into contact with each other within intermediate layer 13. As a result, CMC may readily burn away.

The method of producing a positive electrode according to the present embodiment may include at least (a) to (d) below:

(a) preparing a first dispersion by mixing at least a binder, an inorganic filler, and water;

(b) preparing a second dispersion by mixing at least the first dispersion and a conductive material;

(c) forming intermediate layer 13 by applying the second dispersion to a surface of positive electrode current collector 11 and drying; and (d) forming positive electrode active material layer 12 on a surface of intermediate layer 13 to produce positive electrode 10.

The binder is a polymer compound that burns away when heated to 450° C. in the co-presence of the inorganic filler.

Herein, the description "(a polymer compound) burns away" means that the polymer compound has a "post-heating residual mass ratio" not lower than 0 mass % and not higher than 1 mass %. The post-heating residual mass ratio is determined by the following equation (3):

$$\text{Post-heating residual mass ratio} = M_1/M_0 \times 100 \qquad (3)$$

(where $M_0$ represents the mass of the polymer compound before a heating test and $M_1$ represents the mass of the polymer compound after a heating test). The procedure of the heating test is described in Examples below.

<Negative Electrode>

Negative electrode 20 is in sheet form. Negative electrode 20 includes a negative electrode current collector 21 and a negative electrode active material layer 22. Between negative electrode current collector 21 and negative electrode active material layer 22, intermediate layer 13 described above may be interposed. With intermediate layer 13 thus included in negative electrode 20, heat generation occurring upon an external input may decrease.

Negative electrode current collector 21 is a conductive sheet. The thickness of negative electrode current collector 21 may be not smaller than 1 μm and not greater than 15 μm, for example. Negative electrode current collector 21 may be a copper (Cu) foil, for example. The thickness of the Cu foil may be not smaller than 5 μm and not greater than 12 μm. The thickness of the Cu foil may be not smaller than 5 μm and not greater than 8 μm. Negative electrode current collector 21 may be a Ti foil, for example. The thickness of the Ti foil may be not smaller than 1 μm and not greater than 15 μm, for example.

Negative electrode active material layer 22 is formed on a surface of negative electrode current collector 21. Negative electrode active material layer 22 may be formed on only one side of negative electrode current collector 21. Negative electrode active material layer 22 may be formed on both sides of negative electrode current collector 21. The thickness of negative electrode active material layer 22 may be not smaller than 40 μm and not greater than 125 μm. Negative electrode active material layer 22 contains at least a negative electrode active material. For instance, negative electrode active material layer 22 may contain a conductive material in an amount not lower than 0.1 mass % and not higher than 10 mass % and a binder in an amount not lower than 0.1 mass % and not higher than 10 mass % with the remainder being made up of the negative electrode active material.

Typically, the negative electrode active material is in the form of particles. The D50 of the negative electrode active material may be not lower than 1 μm and not higher than 30 μm, for example. The negative electrode active material is not particularly limited. The negative electrode active material may be at least one selected from the group consisting of graphite, soft carbon, hard carbon, amorphous carbon, and silicon oxide, for example. For instance, the negative electrode active material may be graphite coated with amorphous carbon on its surface.

When the negative electrode active material includes silicon oxide, the content of the silicon oxide in the entire negative electrode active material may be not lower than 4 mass % and not higher than 70 mass %. The silicon oxide may be preliminarily doped with lithium (Li). The silicon (Si) content of the silicon oxide after Li-doping (LiSiO) may be not lower than 10 mol % and not higher than 80 mol %.

In the present embodiment, a capacity ratio (the ratio of negative electrode capacity to positive electrode capacity) may be not lower than 1.05 and not higher than 2.2, for example. The capacity ratio may be determined by dividing the negative electrode capacity by the positive electrode capacity. The negative electrode capacity may be determined by multiplying the total mass of the negative electrode active material contained in negative electrode 20 by the specific capacity of the negative electrode active material. The positive electrode capacity may be determined by multiplying the total mass of the positive electrode active material contained in positive electrode 10 by the specific capacity of the positive electrode active material.

The conductive material contained in negative electrode active material layer 22 is not particularly limited. The conductive material may be at least one selected from the group consisting of carbon black, CNT, and graphene, for example.

The binder contained in negative electrode active material layer 22 is not particularly limited. The binder may be at least one selected from the group consisting of CMC and styrene-butadiene rubber (SBR), for example.

<Separator>

Separator 30 is a porous film. Separator 30 is electrically insulating. Separator 30 may have a monolayer structure. Separator 30 may consist of a porous polyethylene (PE) film, for example. The thickness of separator 30 having a monolayer structure may be not smaller than 5 μm and not greater than 30 μm, for example. Separator 30 may have a multilayer structure. Separator 30 may be formed by, for example, stacking a porous polypropylene (PP) film, a porous PE film, and a porous PP film in this order. The thickness of separator 30 having a multilayer structure may be not smaller than 10 μm and not greater than 30 μm, for example. Within separator 30 having a multilayer structure, each of the porous PP film and the porous PE film may have a thickness not smaller than 3 μm and not greater than 10 μm, for example.

On a surface of separator 30, a heat-resistant film may be formed. The thickness of the heat-resistant film may be not smaller than 2 μm and not greater than 12 μm. The heat-resistant film contains a heat-resistant material. For instance, the heat-resistant film may consist of a binder in an amount not lower than 2 mass % and not higher than 30 mass % with the remainder being made up of an inorganic filler. The binder is not particularly limited. The binder may be at least one selected from the group consisting of acrylic resins, PVdF, PVdF-HFP, aramids, SBR, and PTFE, for example. The inorganic filler is not particularly limited. The inorganic filler may be at least one selected from the group consisting of boehmite, α-alumina, titania, zirconia, magnesia, aluminum hydroxide, magnesium hydroxide, and zinc hydroxide, for example.

The heat-resistant film may also be formed on a surface of positive electrode active material layer 12. The heat-resistant film may also be formed on a surface of negative electrode active material layer 22.

<Electrolyte>

The electrolyte is a Li-ion conductor. The electrolyte may be any of a liquid electrolyte, a gelled electrolyte, and a solid electrolyte. The liquid electrolyte may be an electrolyte solution and/or an ionic liquid, for example. In the present specification, the electrolyte in the form of electrolyte solution is described as an example.

The electrolyte solution contains a solvent and a supporting salt. The supporting salt is dissolved in the solvent. The concentration of the supporting salt may be not lower than 0.5 mol/L and not higher than 2 mol/L (not lower than 0.5 M and not higher than 2 M), for example. The supporting salt may be at least one selected from the group consisting of $LiPF_6$, $LiBF_4$, $LiN(FSO_2)_2$, and $LiN(CF_3SO_2)_2$, for example.

The solvent is aprotic. The solvent may contain a cyclic carbonate and a chain carbonate, for example. The mixing ratio of the cyclic carbonate and the chain carbonate may be "(cyclic carbonate):(chain carbonate)=1:9 to 5:5 (volume ratio)", for example. The cyclic carbonate may be at least one selected from the group consisting of ethylene carbonate (EC), propylene carbonate (PC), butylene carbonate (BC), and fluoroethylene carbonate (FEC), for example.

The chain carbonate may be at least one selected from the group consisting of dimethyl carbonate (DMC), ethyl methyl carbonate (EMC), and diethyl carbonate (DEC), for example.

The solvent may contain a lactone, a cyclic ether, a chain ether, and/or a carboxylate ester, for example. The lactone may be γ-butyrolactone (GBL) and/or δ-valerolactone (DVL), for example. The cyclic ether may be tetrahydrofuran (THF), 1,3-dioxolane (DOL), and/or 1,4-dioxane (DX), for example. The chain ether may be 1,2-dimethoxyethane (DME), for example. The carboxylate ester may be methyl formate (MF), methyl acetate (MA), and/or methyl propionate (MP), for example.

The electrolyte solution may further contain various additive agents in addition to the solvent and the supporting salt. The concentration of the additive agents may be not lower than 0.005 mol/L and not higher than 0.5 mol/L, for example. The additive agent may be a gas generation agent (the so-called anti-overcharging additive), a solid electrolyte interface (SEI) film-forming agent, and a flame retardant, for example.

The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiBF_2(C_2O_4)$, $LiPF_2(C_2O_4)_2$, $LiPO_2F_2$, propane sultone (PS), and/or ethylene sulfite (ES), for example. The flame retardant may be phosphazene, for example. The electrolyte solution may contain only one type of the additive agents. The electrolyte solution may contain two or more types of the additive agents.

EXAMPLES

Next, examples of the present disclosure are described. However, the description below does not limit the scope of claims.

Experiment 1: CMC Content

<<Producing Battery>>

Battery 100 of each of Examples 1 to 8 and Comparative Example 1 was produced. Each battery 100 includes intermediate layer 13 specified in Table 1 below. The thickness of intermediate layer 13 is 2 μm. As specified in Table 1 below, Examples 1 to 8 and Comparative Example 1 have different CMC contents of intermediate layer 13. The structure of each battery 100 except intermediate layer 13 is described below.

(Battery Structure)

1. Positive electrode 10

Positive electrode current collector 11: Al foil (thickness, 15 μm)

Positive electrode active material layer 12: 75 μm in thickness per one side (150 μm for both sides combined)

2. Negative electrode 20

Negative electrode current collector 21: Cu foil (thickness, 10 μm)

Negative electrode active material layer 22: 80 μm in thickness per one side (160 μm for both sides combined)

3. Capacity ratio "(negative electrode capacity)/(positive electrode capacity)"=1.9

4. Separator 30

Porous PE film (thickness, 16 μm)

Heat-resistant film (thickness, 5 μm)

Heat-resistant film composition: [boehmite:(acrylic resin)=96:4 (mass ratio)]

5. Electrolyte (electrolyte solution)

Solvent: [EC:EMC:DMC=3:3:4 (volume ratio)]

Supporting salt: $LiPF_6$ (1.1 mol/L)

6. Electrode array 50

Width dimension (dimension in the x-axis direction in FIG. 1): 130 mm

Height dimension (dimension in the z-axis direction in FIG. 1): 50 mm

Winding tension: not lower than 0.35 N/mm² and not higher than 4.3 N/mm²

The "winding tension" refers to a value determined by dividing the tension applied to separator 30 during winding by the sectional area of separator 30.

<<Evaluation>>

(High-Load Charge-Discharge Test)

A high-load charge-discharge test was carried out to evaluate the rate of rise in resistance during normal operation. This high-load charge-discharge test is an accelerated test involving accelerating a rise in resistance.

1,000 cycles of charge and discharge were carried out. A single cycle consisted of a sequence of "charge", "first rest", "discharge", and "second rest", which are described below. Both after the first cycle and after the 1,000th cycle, battery resistance was measured. By dividing the battery resistance measured after 1,000th cycle by the battery resistance measured after the first cycle, the rate of rise in resistance was calculated. The rate of rise in resistance is shown in Table 1 below.

Charge: rate=2.5 C, duration=240 seconds

First rest: 120 seconds

Discharge: rate=30 C, duration=20 seconds

Second rest: 120 seconds

At a rate of 1 C, discharging battery 100 from its rated capacity completes in one hour. A rate of 2.5 C is 2.5 times greater than a rate of 1 C. A rate of 30 C is 30 times greater than a rate of 1 C.

(Nail Penetration Test)

A nail penetration test was carried out to evaluate heat generation occurring upon an external input.

A nail was prepared. The shank diameter of the nail was 3 mm. Battery 100 was charged. After charging, battery 100 was warmed to 60° C. Into the charged, warmed battery 100, the nail was driven. The surface temperature of casing 80 was measured at a position 1 cm away from where the nail was driven. The "Maximum temperature" in Table 1 below refers to the highest value of the surface temperature observed after the nail was driven. The lower the maximum temperature is, the more mitigated the heat generation occurring upon an external input may have been.

TABLE 1

| | Intermediate layer | | | | | | | | Evaluation | |
|---|---|---|---|---|---|---|---|---|---|---|
| | Component | | | | Content | | | | High-load charge-discharge test | Nail penetration test |
| | Inorganic filler Type | Conductive material Type | Polymer compound Type | CMC Mw | Inorganic filler mass % | Conductive material mass % | Polymer compound mass % | CMC mass % | Rate of rise in resistance % | Maximum temperature ° C. |
| Ex. 1 | Titania (rutile) | AB | Acrylic resin | 300,000 | 96.5 | 2 | 1 | 0.5 | 133 | 182 |
| Ex. 2 | Titania (rutile) | AB | Acrylic resin | 300,000 | 95 | 2 | 1 | 2 | 136 | 174 |
| Ex. 3 | Alumina | AB | Acrylic resin | 300,000 | 87 | 2 | 1 | 10 | 138 | 173 |
| Ex. 4 | Magnesium hydroxide | AB | Acrylic resin | 300,000 | 77 | 2 | 1 | 20 | 140 | 169 |
| Ex. 5 | Boehmite | AB | Acrylic resin | 300,000 | 67 | 2 | 1 | 30 | 144 | 163 |
| Ex. 6 | Titania (anatase) | AB | Acrylic resin | 300,000 | 57 | 2 | 1 | 40 | 148 | 159 |
| Ex. 7 | Titania (rutile) | AB | Acrylic resin | 300,000 | 96.8 | 2 | 1 | 0.2 | 132 | 192 |
| Ex. 8 | Titania (rutile) | AB | Acrylic resin | 300,000 | 52 | 2 | 1 | 45 | 150 | 156 |
| Comp. Ex. 1 | Titania (rutile) | AB | PVdF | — | 97 | 2 | 1 | 0 | 131 | 325 |

<<Results>>

As shown in Table 1 above, the maximum temperature in a nail penetration test of each of Examples 1 to 8 is lower than that of Comparative Example 1. This indicates that heat generation occurring upon an external input in Examples 1 to 8 is mitigated compared to Comparative Example 1. In Examples 1 to 8, intermediate layer 13 contains both CMC and an inorganic filler. In Comparative Example 1, intermediate layer 13 does not contain CMC.

In the examples with a CMC content of 0.5 mass % or higher, the maximum temperature in a nail penetration test tends to be low. In the examples with a CMC content of 40 mass % or lower, the rate of rise in resistance in a high-load charge-discharge test tends to be low.

Experiment 2: Heating Test

Various compositions in intermediate layers 13 were analyzed by a heating test. More specifically, a sample of each of Reference Examples 1 to 4 specified in Table 2 below was heated in the atmosphere and then the composition of the heated residue was analyzed.

<<Samples>>

Reference Example 1: CMC alone
Reference Example 2: PVdF alone
Reference Example 3: mixture of CMC and inorganic filler
Reference Example 4: mixture of PVdF and inorganic filler <<Procedure>>

The test procedure is described below.

In the atmosphere, a predetermined amount of each sample is placed in a heat-resistant container. The predetermined amount is about 1 to 5 g. The heat-resistant container is made of Al. Then, a thermocouple is attached to the heat-resistant container. The thermocouple may be fixed to the heat-resistant container with a polyimide tape, for example. With the thermocouple, the temperature of the heat-resistant container is measured. The heat-resistant container is placed in a furnace. For example, the furnace may be a muffle furnace. However, the furnace is not limited to a muffle furnace provided that the heating conditions specified above are attained.

The temperature of the heat-resistant container is raised from room temperature (about 25° C.) to reach 450° C. at a rate of 5° C./min. Once the temperature of the heat-resistant container reaches 450° C., the temperature of the heat-resistant container is maintained at 450° C. for one hour. Subsequently, the temperature of the heat-resistant container is lowered to reach room temperature at a rate of 7.5° C./min.

After the heating test, each sample was analyzed for changes in mass (namely, the post-heating residual mass ratio), changes in color, and changes in composition. The changes in composition were checked by x-ray diffraction (XRD). Results are shown in Table 2 below.

TABLE 2

| | Component | Heated residue |
|---|---|---|
| Ref. Ex. 1 | CMC:(inorganic filler) = 100:0 (mass ratio) | Carbonized CMC |
| Ref. Ex. 2 | PVdF:(inorganic filler) = 100:0 (mass ratio) | Carbonized PVdF |
| Ref. Ex. 3 | CMC:(inorganic filler) = 20:80 (mass ratio) | Inorganic filler alone (no carbonized CMC) |
| Ref. Ex. 4 | PVdF:(inorganic filler) = 20:80 (mass ratio) | Carbonized PVdF |

As shown in Table 2 above, Reference Example 3 (in which a mixture of CMC and an inorganic filler is used) had a post-heating residual mass ratio of CMC of substantially 0 mass %. This indicates that CMC burned away in Reference Example 3. In other reference examples, carbonized matter of the binder (CMC and PVdF) remained.

The results of Experiment 2 suggest that the maximum temperatures in a nail penetration test in Examples 1 to 8 in Experiment 1, as shown in Table 1, are low because CMC burned away; and that the maximum temperature in a nail penetration test in Comparative Example 1 in Experiment 1 is high because PVdF was carbonized.

Experiment 3: Weight Average Molecular Weight (Mw) of CMC

<<Producing Battery>>

Battery 100 of each of Examples 9 to 14 was produced. Each battery 100 includes intermediate layer 13 specified in Table 3 below. Examples 9 to 14 differ in the Mw of CMC.

<<Evaluation>>

In the same manner as in Experiment 1, a high-load charge-discharge test and a nail penetration test were carried out. Results are shown in Table 3 below.

TABLE 3

| | Intermediate layer | | | | | | | | Evaluation | |
|---|---|---|---|---|---|---|---|---|---|---|
| | Component | | | | Content | | | | High-load charge-discharge test | Nail penetration test |
| | Inorganic filler Type | Conductive material Type | Polymer compound Type | CMC Mw | Inorganic filler mass % | Conductive material mass % | Polymer compound mass % | CMC mass % | Rate of rise in resistance % | Maximum temperature ° C. |
| Ex. 9 | Titania (rutile) | AB | Acrylic resin | 250,000 | 94 | 2 | 1 | 3 | 134 | 182 |
| Ex. 10 | Titania (rutile) | AB | Acrylic resin | 330,000 | 94 | 2 | 1 | 3 | 137 | 172 |
| Ex. 11 | Titania (rutile) | AB | Acrylic resin | 400,000 | 94 | 2 | 1 | 3 | 138 | 169 |
| Ex. 12 | Titania (rutile) | AB | Acrylic resin | 500,000 | 94 | 2 | 1 | 3 | 140 | 166 |
| Ex. 13 | Titania (rutile) | AB | Acrylic resin | 200,000 | 94 | 2 | 1 | 3 | 131 | 194 |
| Ex. 14 | Titania (rutile) | AB | Acrylic resin | 520,000 | 94 | 2 | 1 | 3 | 151 | 165 |

<<Results>>

As shown in Table 3 above, in the examples with an Mw of CMC of 250,000 or higher, the maximum temperature in a nail penetration test tends to be low, and in the examples with an Mw of CMC of 500,000 or lower, the rate of rise in resistance in a high-load charge-discharge test tends to be low.

Experiment 4: Polymer Compound Other than CMC

<<Producing Battery>>

Battery 100 of each of Examples 15 and 16 was produced. Each battery 100 includes intermediate layer 13 specified in Table 4 below. As shown in Table 4 below, Examples 15 and 16 differ in whether a polymer compound other than CMC (acrylic resin) is contained.

<<Evaluation>>

In the same manner as in Experiment 1, a high-load charge-discharge test and a nail penetration test were carried out. Results are shown in Table 4 below.

TABLE 4

| | Intermediate layer | | | | | | | | Evaluation | |
|---|---|---|---|---|---|---|---|---|---|---|
| | Component | | | | Content | | | | High-load charge-discharge test | Nail penetration test |
| | Inorganic filler Type | Conductive material Type | Polymer compound Type | CMC Mw | Inorganic filler mass % | Conductive material mass % | Polymer compound mass % | CMC mass % | Rate of rise in resistance % | Maximum temperature ° C. |
| Ex. 15 | Titania (rutile) | AB | Acrylic resin | 320,000 | 95.5 | 2 | 0 | 2.5 | 134 | 156 |
| Ex. 16 | Titania (rutile) | AB | Acrylic resin | 320,000 | 94.5 | 2 | 1 | 2.5 | 137 | 173 |

<<Results>>

As shown in Table 4 above, in the examples in which intermediate layer 13 contains essentially no polymer compound other than CMC, the maximum temperature in a nail penetration test tends to be low and the rate of rise in resistance in a high-load charge-discharge test also tends to be low.

The embodiments and examples disclosed herein are illustrative and non-restrictive in any respect. The technical scope indicated by the claims is intended to include any modifications within the scope and meaning equivalent to the terms of the claims.

What is claimed is:

1. A non-aqueous electrolyte secondary battery comprising at least:
    a positive electrode;
    a negative electrode; and
    an electrolyte,
    the positive electrode including a positive electrode current collector, an intermediate layer, and a positive electrode active material layer,
    the intermediate layer being interposed between the positive electrode current collector and the positive electrode active material layer, and
    the intermediate layer containing at least carboxymethylcellulose, a polymer binder, a conductive material, and an inorganic filler,
    wherein the polymer binder does not include the carboxymethylcellulose,
    the carboxymethylcellulose is contained in the intermediate layer in an amount higher than an amount of the polymer binder,
    the carboxymethylcellulose has a weight average molecular weight not lower than 200,000 and not higher than 520,000, and
    the carboxymethylcellulose is contained in the intermediate layer in an amount not lower than 30 mass % and not higher than 45 mass %.

2. The non-aqueous electrolyte secondary battery according to claim 1, wherein the carboxymethylcellulose has a weight average molecular weight not lower than 250,000 and not higher than 500,000.

3. The non-aqueous electrolyte secondary battery according to claim 1, wherein the inorganic filler is at least one selected from the group consisting of boehmite, aluminum hydroxide, magnesium hydroxide, and zinc hydroxide.

4. The non-aqueous electrolyte secondary battery according to claim 1, wherein the polymer binder is contained in the intermediate layer in an amount higher than 0 mass % and not higher than 1 mass %.

* * * * *